(12) United States Patent
Ye et al.

(10) Patent No.: US 12,335,869 B2
(45) Date of Patent: Jun. 17, 2025

(54) SYSTEMS AND METHODS FOR PAGING EARLY INDICATION AND PAGING SUBGROUPING

(71) Applicant: Apple Inc., Cupertino, CA (US)

(72) Inventors: Sigen Ye, Whitehouse Station, NJ (US); Chunxuan Ye, San Diego, CA (US); Dawei Zhang, Saratoga, CA (US); Haitong Sun, Cupertino, CA (US); Huaning Niu, San Jose, CA (US); Oghenekome Oteri, San Diego, CA (US); Sethuraman Gurumoorthy, San Ramon, CA (US); Seyed Ali Akbar Fakoorian, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 17/570,308

(22) Filed: Jan. 6, 2022

(65) Prior Publication Data

US 2023/0232325 A1     Jul. 20, 2023

(51) Int. Cl.
*H04W 52/02* (2009.01)
*H04W 68/02* (2009.01)

(52) U.S. Cl.
CPC ... *H04W 52/0229* (2013.01); *H04W 52/0245* (2013.01); *H04W 52/0261* (2013.01); *H04W 68/02* (2013.01)

(58) Field of Classification Search
CPC ........ H04W 52/0229; H04W 52/0245; H04W 52/0261; H04W 68/02
See application file for complete search history.

(56) References Cited

U.S. PATENT DOCUMENTS

| | | | |
|---|---|---|---|
| 2015/0092645 A1* | 4/2015 | Tabet | H04L 1/1812 370/311 |
| 2020/0022117 A1* | 1/2020 | Dong | H04L 1/08 |
| 2022/0046582 A1* | 2/2022 | Shrivastava | H04W 68/02 |
| 2022/0232514 A1* | 7/2022 | Tseng | H04W 60/00 |
| 2023/0007600 A1* | 1/2023 | Xu | H04W 52/52 |

* cited by examiner

*Primary Examiner* — Jinsong Hu
*Assistant Examiner* — Farideh Madani
(74) *Attorney, Agent, or Firm* — Brownstein Hyatt Farber Schreck, LLP

(57) ABSTRACT

Systems, methods, and apparatus for paging early indication (PEI) and paging subgrouping are described herein. One described user equipment (UE) includes a set of one or more transceivers and a processor. The processor is configured to transmit, via the set of one or more transceivers, UE assistance information including a preferred time offset between receipt of a PEI by the UE and receipt of a paging occasion (PO) by the UE; transition from a sleep state to an awake state prior to the PO; and monitor for the PEI via the set of one or more transceivers, after transitioning to the awake state.

20 Claims, 10 Drawing Sheets

SYSTEMS AND METHODS FOR PAGING EARLY INDICATION AND PAGING SUBGROUPING

TECHNICAL FIELD

This application relates generally to wireless communication systems, including systems, methods, and apparatus for handling paging early indication (PEI) and paging subgrouping.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with a network. Therefore, the UE as described herein is used to represent any appropriate electronic device.

In 3GPP 4G/LTE and 5G/NR wireless communication systems, a UE in an idle (e.g., radio resource control (RRC)_IDLE) or inactive (e.g., RRC_INACTIVE) state may be paged. If a UE receives a page, the UE may transition to an active state and await further communication from a RAN or CN. A UE in an RRC_CONNECTED state may also be paged, but the paging of UEs in an RRC_CONNECTED state is not the focus of this description.

When in an idle or inactive state, a UE may periodically wake up in accord with a discontinuous reception (DRX) cycle, or paging cycle, and monitor a PO (e.g., one or more time and frequency resources) to determine whether it has been paged. A DRX cycle may be measured in terms of radio frames. A commonly used value of a DRX cycle is 128 radio frames. One radio frame is 10 milliseconds (ms). Therefore, if a DRX cycle is 128 radio frames, a UE wakes up every 1.28 seconds(s) to determine whether the UE has been paged (i.e., to determine whether there is paging information for the UE).

Figure 1:
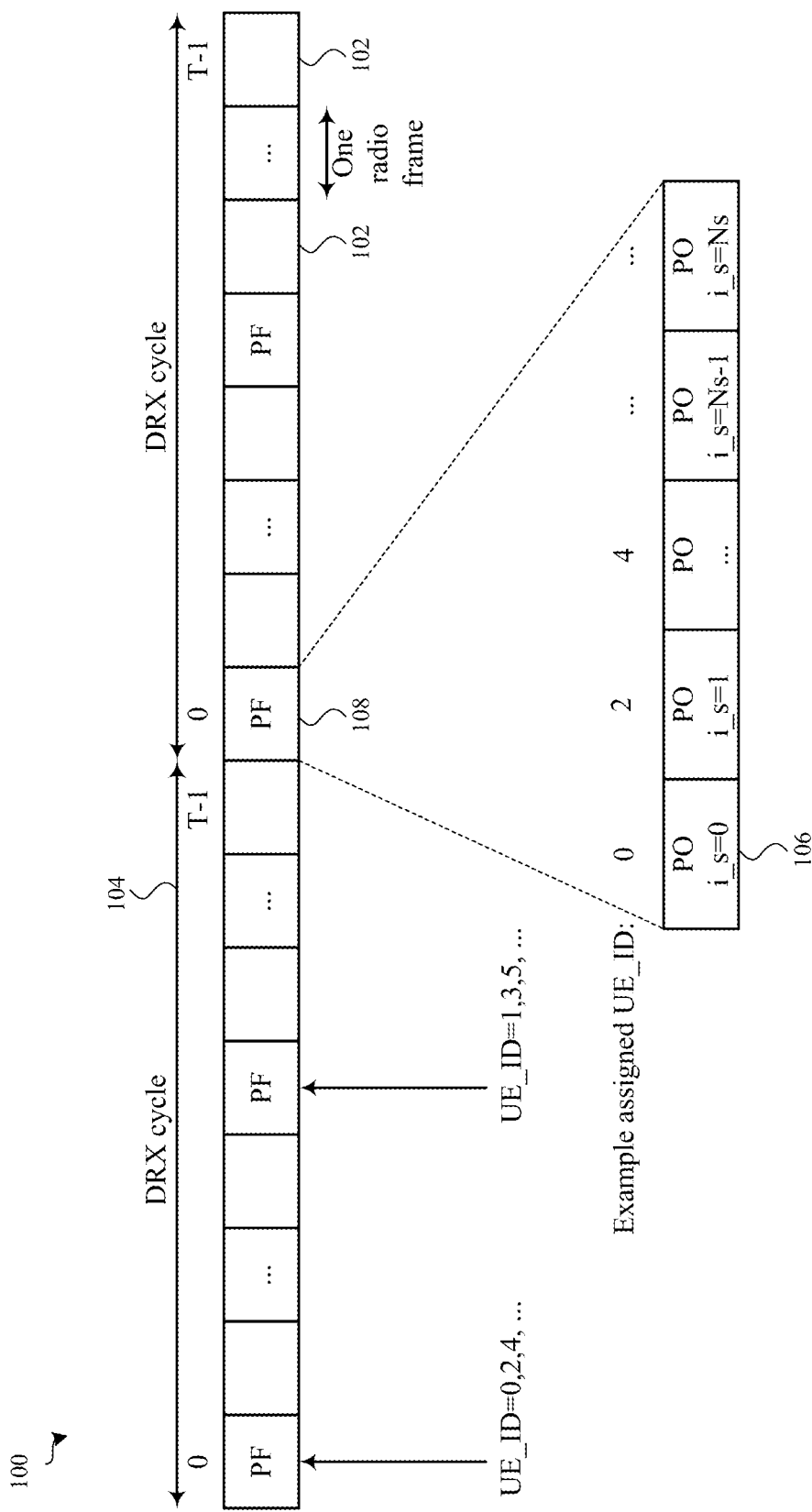
FIG. 1 illustrates an example configuration of paging frames (PFs) and paging occasions (POs) within a DRX cycle of a UE.

FIG. 1 illustrates an example configuration 100 of PFs and POs within a DRX cycle of a UE. In particular, FIG. 1 shows a series of radio frames 102. An example UE, having a UE identifier (UE_ID) of 0 (i.e., UE_ID=0) and a DRX cycle 104 of T radio frames 102 (e.g., radio frames 0 to T−1), may have a PO 106 within a PF 108. By way of example, the DRX cycle 104 is shown to encompass two PFs (e.g., PF0 and PF1). The example UE has a PO 106 within the first PF (i.e., PF0). As shown, each PF may include multiple POs. Each PO may be associated with an index ($i\_s$) between 0 and Ns, where Ns is the number of POs in a PF.

Every time a UE wakes up to monitor a PO, the UE consumes relatively more power than when it is asleep (e.g., in a low power state). For a battery-operated UE, greater power consumption reduces the UE's remaining battery life. This sometimes provides a user with a less satisfactory user experience. Described herein are systems, methods, and apparatus that can reduce the power consumed by a UE and provide a more satisfactory user experience.

Figure 2:
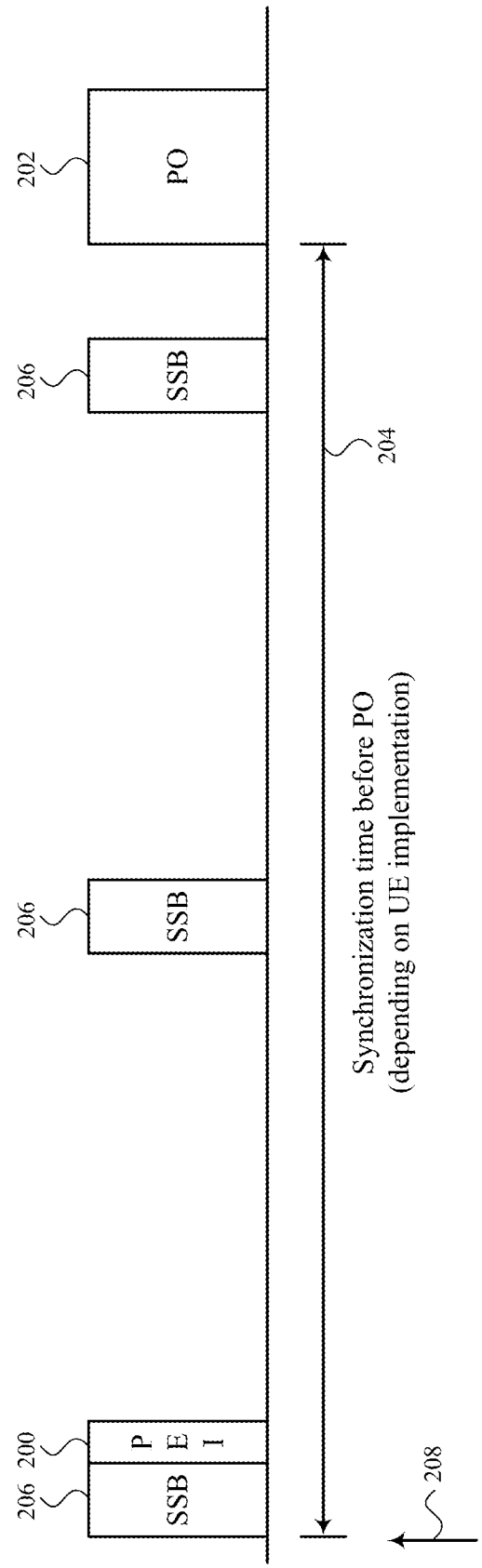
FIG. 2 illustrates an example transmission of a PEI before a PO.

One way to help UEs conserve power is for a network to transmit a PEI before a PO. As one example, FIG. 2 illustrates a transmission of a PEI 200 before a PO 202. Before a UE can receive the PO 202, the UE may need to wake up a time 204 before the PO 202, for purposes of performing automatic gain control (AGC), performing time/frequency tracking, and so on. Depending on the UE's radio frequency (RF) condition, and to achieve sufficient synchronization accuracy, the UE may need to wake up early enough to monitor one or more synchronization signal blocks (SSBs) 206. By way of example, a UE may wake at time 208 and monitor three SSBs 206, as shown in FIG. 2.

A PEI 200 includes a bit per PO, or a bit per PO and paging subgroup, that indicates whether a UE needs to stay awake and monitor a respective PO. If the PEI bit 200 associated with a UE's PO/subgroup 202 is set (or positive), the UE continues to prepare to monitor the PO. If the PEI is not set (or negative), the UE can go back to sleep until its next DRX cycle. A PEI can therefore provide power savings for UEs that are not paged in a particular DRX cycle.

In a 5G/NR wireless communication system, a UE may be configured with a specific UE identifier (UE_ID; e.g., a 5G serving temporary mobile subscriber identity (5G-STMSI) or a 5G inactive radio network temporary identifier (5G-RNTI)), based on whether the UE is in an RRC_IDLE or RRC_INACTIVE state, to help the UE derive a PF and a PO where it is expected to receive a page from the network (e.g., a RAN or CN). Since the numbers of PFs and POs are limited, it is possible that multiple UEs will monitor the same PO in expectation of a network-initiated page. Due to the many-to-one mapping nature of a UE-ID based PF and PO computation, and the limited number of actual PFs and POs, many UEs can end up monitoring the same PO.

When there is a paging message for one of the UEs monitoring the same PO, all of the UEs that are monitoring the PO will receive the paging message on a physical downlink shared channel (PDSCH). However only one of the UEs, for which the UE-ID (ue-Identity) in any of the paging records (PagingRecords) matches the UE's UE-ID, will act on the paging message. The other UEs will ignore the paging message. When a UE wakes up and receives a paging message on PDSCH, and the paging message is not intended for the UE, this is referred to as a "false page."

When multiple UEs monitor the same PO, a UE may unnecessarily receive and decode a PDSCH associated with a different UE's page, which increases the UE's power consumption. Power consumption for processing (e.g., decoding) both physical downlink control channel (PDCCH; the physical channel that carries downlink control information (DCI)) and PDSCH (the data bearing channel) in layer 1 (L1) is, according to some estimates, about 2.4 times the power consumption of processing PDCCH alone.

When the network initiates a page to a UE, and in the absence of clear cell level information on where the UE is located, a network may initially page a UE within a given tracking area (TA)/RAN notification area. If the network does not receive a response from the UE, the network may progressively increase the scope of paging by repeating the UE's page in a larger geographical area. If the network does not receive a response from the UE, the network may iteratively increase its paging area scope to include additional geographical areas. This further increases the likelihood that other UEs (e.g., non-intended IDLE/INACTIVE UEs) will receive false pages.

To reduce the paging false alarm probability, a network could more accurately record the current location of the IDLE/INACTIVE UE that it wishes to page, such that the network could reduce the paging geography scope and mitigate the need to increase the paging geography scope due to unsuccessful pages. Additionally or alternatively, a network could map a smaller number of UEs to a PO, with the intent of reducing the number of UEs that are unintentionally woken up when the network is trying to deliver a page to a particular UE. However, improved UE tracking solutions are currently not available, and reducing the number of UEs mapped to a PO may introduce other issues.

One way to reduce the number of false pages experienced by a UE is to divide the UEs that share a PO into different paging subgroups. UEs may be divided into paging subgroups in various ways, and in some cases may be divided into paging subgroups based on UE type, power profile, other UE information, or information known by the network (e.g., a RAN or CN). In some cases, UEs that are expected to receive relatively fewer pages and/or are limited by power constraints can be grouped together in a first paging subgroup, while UEs that are expected to receive relatively more pages and/or are less limited by power constraints can be grouped together in a second paging subgroup. A UE may then be notified, prior to its PO, and as part of a PEI, whether a PO contains paging information for its paging subgroup. If the PO does not contain such paging information, the UE need not wake up and decode the PDSCH during the PO.

A UE may be notified of whether a PO contains paging information for its paging subgroup in different ways. For example, a UE may be notified using a downlink control information (DCI)-based notification or a PEI-based notification. For a DCI-based notification, a paging indication for a paging subgroup may be provided using paging DCI. For example, the network may indicate whether a paging subgroup (or whether each paging subgroup) needs to monitor a corresponding PO (or paging PDSCH). In some cases, spare bits in paging DCI may be used for this purpose. For example, there are six bits reserved in the DCI format 1_0 with paging RNTI (P-RNTI; see, e.g., section 7.3.1.2.1 of 3GPP technical specification (TS) 23.212), and there are 5 bits reserved in the Short Message for paging (see section 6.5 in 3GPP TS 38.331). These bits could potentially be used to defined "paging subgroups", and a UE may be assigned to a paging subgroup during registration/attach. When the UE is paged, the CN may include the paging subgroup of the UE in its paging message, and the RAN may transfer the paging subgroup in the paging DCI. Alternatively, a new DCI format may be used, such as DCI format 2_7.

For a PEI-based notification, a paging indication for a paging subgroup may be provided using a paging early indication or wake-up signal (WUS) for paging subgroups. For example, the network may transmit an early indication or wake-up signal before a PO. The indication or WUS may apply to a particular paging subgroup. A UE that does not receive an indication of WUS referencing its paging subgroup need not monitor its corresponding PO.

Different paging subgrouping approaches are possible. For example, CN-assigned paging subgrouping and UEID-based paging subgrouping on a per cell basis may be provided. CN-assigned paging subgrouping may use a CN's access and mobility management function (AMF) to assign a paging subgroup ID to a UE. The AMF may indicate the paging subgroup ID to the UE on a per cell basis using NAS signaling, and may also store the paging subgroup ID in UE context at the CN. The AMF may also convey the subgroup information to a base station for paging the UE when it is in an RRC_IDLE or RRC_INACTIVE state. The base station may inform other base stations in its RAN about a UE's paging subgroup ID for RAN paging. UEID-based paging subgrouping (based on a legacy UE-ID approach) may require, in addition to the already available information for legacy UEID-based grouping in a PO, the total number of UEID-based paging subgroups (Nsg) that are supported by the network. The number Nsg may be determined by a RAN and broadcast in system information. In some cases, Nsg may be controlled on a cell basis and can be different in different cells.

For co-existence of CN-assigned and UEID-based paging subgrouping approaches, all cells in a registration area may support the same number of CN-assigned paging subgroups and UEID-based paging subgroups, so that there is no re-mapping between the two. A RAN may broadcast separate capabilities for CN-assigned paging subgrouping and UEID-based paging subgrouping.

Both the network and individual UEs may indicate their support of CN-assigned paging subgrouping and UEID-based paging subgrouping. UEID-based paging subgrouping may be used as a fallback if CN-assigned paging subgrouping is not supported (that is, assuming that UEID-based paging subgrouping is supported).

Figure 3:
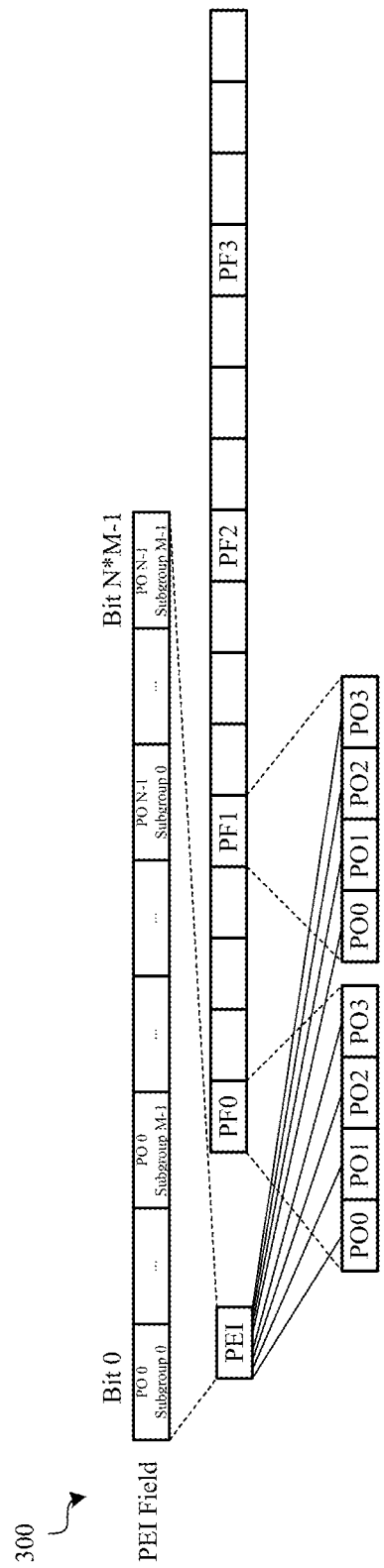
FIG. 3 illustrates an example multiple bit PEI field that provides PEIs for UEs in different paging subgroups.

FIG. 3 illustrates an example multiple bit PEI field 300 that provides PEIs for UEs in different paging subgroups. The PEI field 300 may provide PEIs for one or more POs and one or more paging subgroups across one or more PFs. By way of example, the PEI field 300 includes Bits 0 through N*M−1, where N is the number of POs in a PF, and M is the number of paging subgroups within a PO. A first bit of the PEI field may correspond to a POO and a paging subgroup 0; the next bit may correspond to a POO and a paging subgroup 1; and so on through a bit corresponding to a PO N−1 and a paging subgroup M−1.

One issue within the current PEI framework is that it does not specify how far in advance of a PO a PEI needs to be transmitted. Although the time offset between transmission of a PEI and transmission of a PO may be configured by a base station, the optimum duration of the time offset may be heavily dependent on UE implementation and how to achieve the best power saving gain for particular UEs. For example, some UEs may prefer to have one SSB between reception of a PEI and reception of a PO, other UEs may prefer to have two SSBs between reception of the PEI and reception of the PO. It would be useful if a base station had more information on which to base its determination of a time offset between transmission of a PEI and transmission of a PO.

Technically, the preferred minimum time offset between a UE's reception of a PEI and reception of a PO can depend on the signal-to-interference plus noise ratio (SINR) condition of the UE at a particular time. However, for a UE in an RRC_IDLE or RRC_INACTIVE state, the network may not know the UE's SINR condition.

Figure 4:
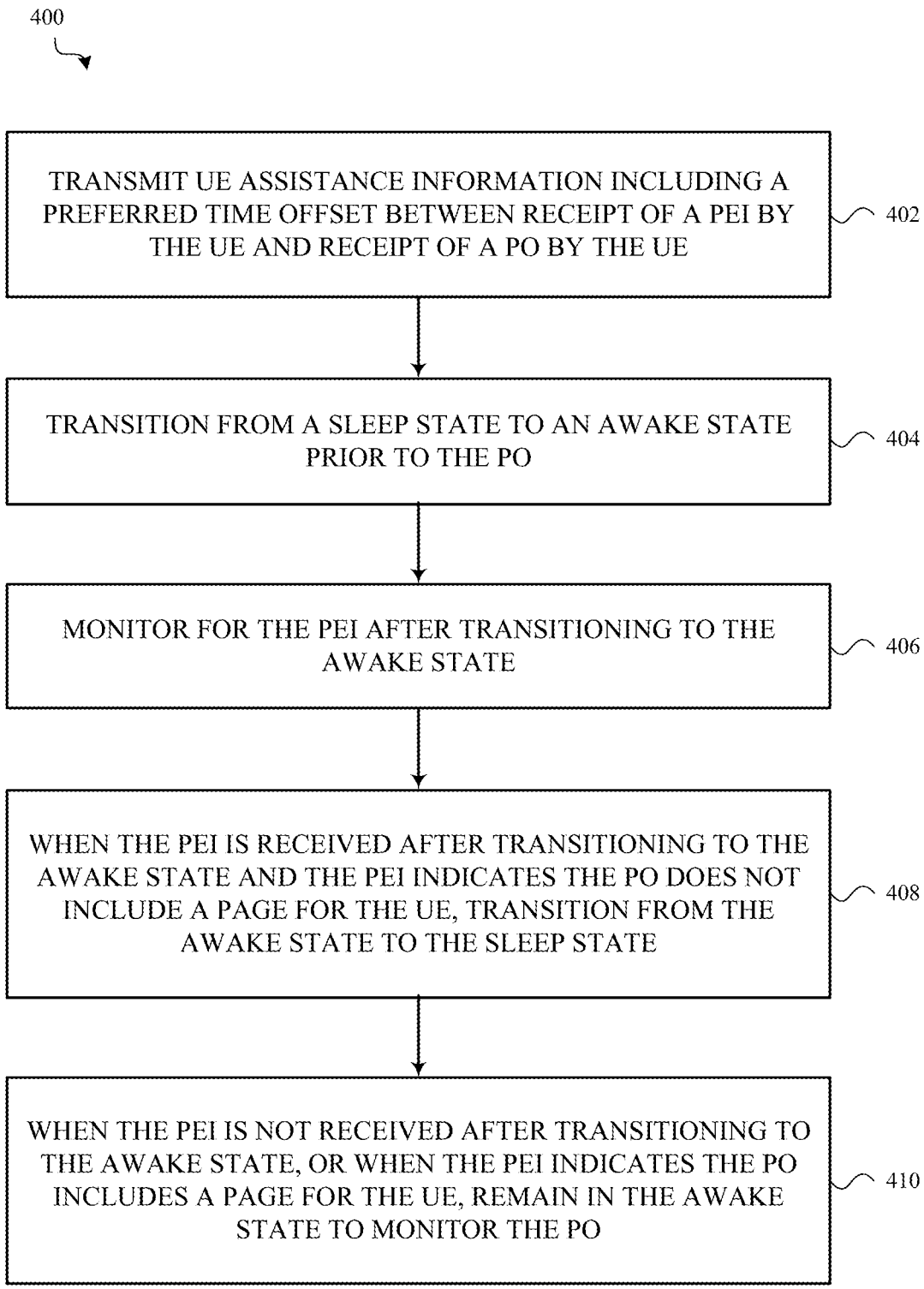
FIG. 4 shows an example method of a UE, which method may be used to help inform a base station's (or network's) determination of a time offset between transmission of a PEI and transmission of a PO.

FIG. 4 shows an example method 400 of a UE, which method 400 may be used to help inform a base station's (or network's) determination of a time offset between transmission of a PEI and transmission of a PO.

At 402, the method 400 may include transmitting UE assistance information (e.g., UE assistance signaling). The UE assistance information may include a preferred time offset between receipt of a PEI by the UE and receipt of a PO by the UE.

At 404, the method 400 may include transitioning from a sleep state to an awake state prior to the PO.

At 406, the method 400 may include monitoring for the PEI after transitioning to the awake state.

At 408, the method 400 may include transitioning from the awake state to the sleep state when the PEI is received after transitioning to the awake state and the PEI indicates the PO does not include a page for the UE.

At 410, the method 400 may include remaining in the awake state to monitor the PO when 1) the PEI is not received after transitioning to the awake state, or 2) the PEI indicates the PO includes a page for the UE.

In some embodiments, the method 400 may include determining the preferred time offset for an SINR (e.g., for an SINR below an SINR threshold) or SINR range (e.g., a low SINR range). The SINR (i.e., SINR value) or SINR range (i.e., SINR value range) may be determined by the UE autonomously, or determined based on one or more threshold SINRs that are predefined and/or signaled by the network. Determining the preferred time offset for an SINR condition (e.g., a low SINR or low SINR range) may enable the UE to achieve a greater power saving gain.

In some embodiments, the method 400 may include estimating an overall power saving gain, for the UE, based on a probability of the UE experiencing different SINR conditions (i.e., based on an SINR distribution), and determining the preferred time offset at least partly in response to the estimated overall power saving gain.

In some embodiments, the UE assistance information may include a set of preferred time offsets, including the preferred time offset mentioned at 402. Each preferred time offset in the set of preferred time offsets may be associated with a different SINR range in a set of SINR ranges. For example, a first preferred time offset may be associated with a low SINR range, a second preferred time offset may be associated with a middle-range SINR, and a third preferred time offset may be associated with a high SINR. In some cases, the set of SINR ranges may be predefined. In some cases, the method 400 may include receiving the set of SINR ranges (e.g., from a network).

The preferred time offset may be reported in various ways. In some embodiments, the preferred time offset may be reported as a number of SSBs (i.e., a number of SSBs that the UE prefers to receive between receiving a PEI and receiving a PO). In some embodiments, the preferred time offset may be reported as a number of slots, a number of symbols, or a number of time units (e.g., ms).

In some embodiments, the method 400 may include determining the preferred time offset, at 402, based on an availability of tracking reference signals (TRSs). For example, the UE can report one preferred time offset when there are one or more TRSs available between the PEI and the PO, and a different preferred time offset when there are no TRSs available between the PEI and the PO. For example, the UE may report a preferred time offset of two SSBs when there are no TRSs between the PEI and the PO, but report a preferred time offset of no SSBs when there are one or more TRSs between the PEI and the PO.

Figure 5:
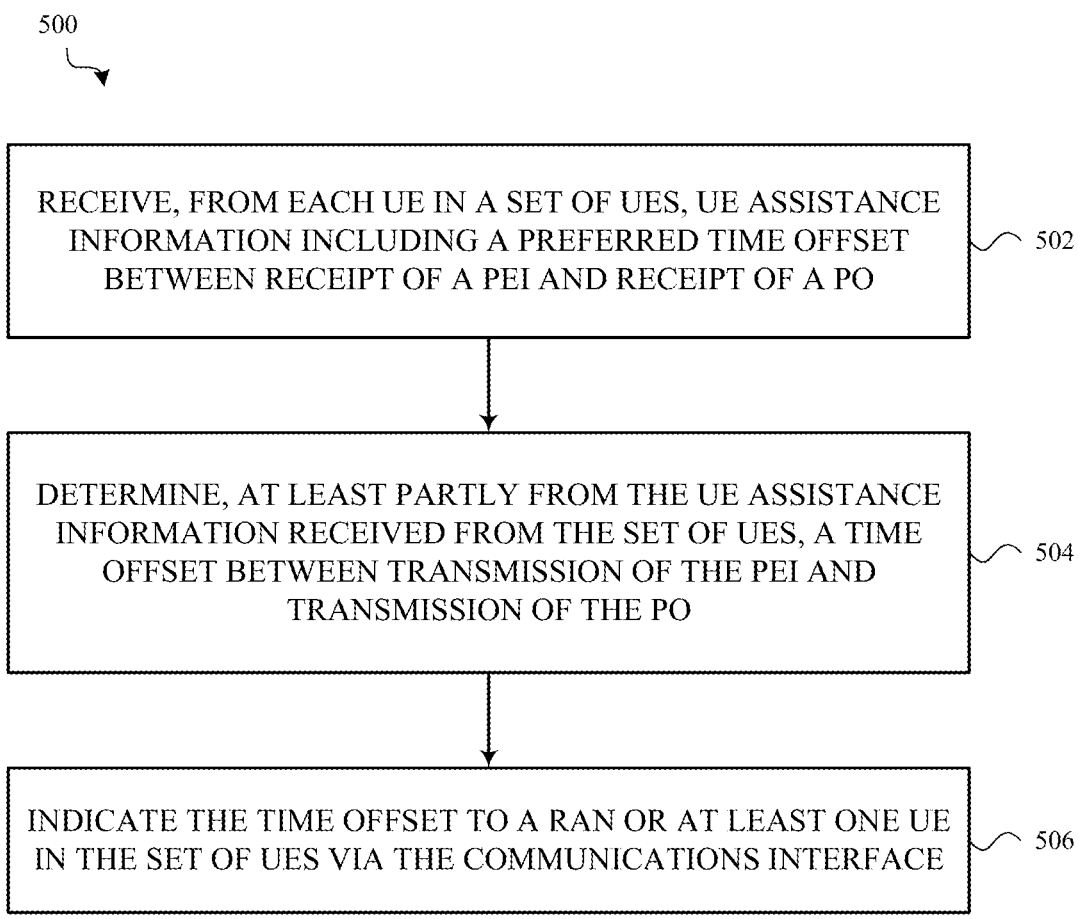
FIG. 5 shows an example method of a network element (e.g., a base station or network server), which method may be used to determine a time offset between transmission of a PEI and transmission of a PO.

FIG. 5 shows an example method 500 of a network element (e.g., a base station or network server), which method 500 may be used to determine a time offset between transmission of a PEI and transmission of a PO.

At 502, the method 500 may include receiving, from each UE in a set of UEs, UE assistance information including a preferred time offset between receipt of a PEI and receipt of a PO.

At 504, the method 500 may include determining, at least partly from the UE assistance information received from the set of UEs, a time offset between transmission of the PEI and transmission of the PO.

At 506, the method 500 may include indicating the time offset to a RAN or at least one UE in the set of UEs.

The preferred time offset may be determined and/or indicated in various ways. In some embodiments, the preferred time offset may be determined and/or indicated as a number of SSBs (i.e., a number of SSBs that a UE prefers to receive between receiving a PEI and receiving a PO). In some embodiments, the preferred time offset may be determined and/or indicated as a number of slots, a number of symbols, or a number of time units (e.g., ms).

In some embodiments of the method 500, the determined time offset may be at least partly based on (or be) a maximum preferred time offset received from the set of UEs.

In some embodiments of the method 500, the determined time offset may be at least partly based on (or be) the time offset preferred by a largest subset of UEs in the set of UEs (i.e., a time offset preferred by the most UEs).

In some embodiments of the method 500, the UE assistance information received from at least some of the UEs, at 502, may include a set of preferred time offsets. Each time offset in the set of preferred time offsets may be associated with a different SINR range in the set of SINR ranges. In these embodiments, the method 500 may include determining SINR statistics across a network including the set of UEs, and determining the time offset, at 504, based at least in part on a subset of preferred time offsets associated with an SINR range. The SINR range may be an SINR range in the set of SINR ranges, and may be an SINR range corresponding to the determined SINR statistics.

In some embodiments, the network may choose to transmit multiple PEIs for one PO, with each PEI having a different time offset relative to the PO. This enables the UE to choose which PEI to monitor, and allows the UE to monitor the PEI that provides the most power saving. In these embodiments, the network may in some cases choose the different time offsets based on UE assistance information.

In some cases, the time offset determined at 504 may be used for all of the cells within a network. Alternatively, similar (but maybe not identical) time offsets may be used for different cells. Using the same or similar time offsets for different cells can facilitate UE mobility within a network. Once a time offset (or set of time offsets) is determined for a network, the time offset(s) may be semi-statically configured and changed infrequently. In other embodiments, the time offset(s) may be updated on a more dynamic basis.

A network may or may not provide support for, or enable, PEI. If a network provides support for or enables PEI, the network may or may not provide support for, or enable, paging subgrouping. Similarly, a UE may or may not provide support for, or enable, monitoring PEI; and if a UE provides support for or enables monitoring PEI, the UE may or may not provide support for, or enable, paging subgrouping.

If it is assumed that PEI and paging subgrouping may be configured differently and independently for different cells of a network (or different cells of different networks), then a UE may interface with cells having three different types of configurations.

A first type of cell may not use PEI (e.g., PEI may not be supported or enabled). In this type of cell, the UE does not need to monitor PEI and subgrouping is not applicable. The UE may monitor a PO according to legacy behaviors defined by 3GPP.

A second type of cell may use PEI (e.g., PEI may be supported and enabled), but not use paging subgrouping (e.g., paging subgrouping may not be supported or enabled). In this type of cell, the cell will transmit a single PEI bit for a PO, and a UE that supports PEI will check this bit to determine whether it needs to remain in an awake state to monitor the PO. A UE that does not support or enable PEI will simply transition from a sleep state to an awake state to monitor a PO and will ignore the PEI.

A third type of cell may use both PEI and paging subgrouping (e.g., both PEI and paging subgrouping may be supported and enabled). The PEI may include multiple bits (e.g., M*N bits, with M being the number of indications (or subgroups) per PO, and N being the number of POs within one or more than one PF). For this type of cell, there are a number of cases that may arise. In a first case, a UE may support the use of PEI and paging subgrouping. Such a UE may be assigned to a paging subgroup, and the UE may use its subgroup ID to determine what PEI bit(s) to monitor in the PEI. In a second case, a UE may not support the use of PEI or paging subgrouping. Such a UE will simply transition from a sleep state to an awake state to monitor a PO and will ignore the PEI. In a third case, a UE may support the use of PEI but not paging subgrouping (because it is not currently mandated that a UE that supports PEI also support paging subgrouping), or a UE may support both PEI and paging subgrouping but not be assigned to a paging subgroup (because it is not currently mandated that a network assign all UEs to a paging subgroup). In this case, the UE's behavior is not currently defined. In particular, the UEs that fall within this case are configured to monitor PEI, but do not know which PEI bit(s) to monitor.

One solution for the third case mentioned above is to prevent it from occurring. This can be done by requiring a UE that is monitoring PEI to use, and be configured for, paging subgrouping. To achieve this, all UEs that support PEI will be required to support paging subgrouping (e.g., at least one of UE_ID based paging subgrouping or CN assigned paging subgrouping). Also, if a network enables paging subgrouping (and PEI) in one or more cells, the network is required to configure paging subgrouping (either UE_ID based paging subgrouping or CN assigned paging subgrouping) for all of the UEs that support PEI monitoring and paging subgrouping. If the network does not enable paging subgrouping (and PEI) in any of its cells, the network does not have to configure paging subgrouping for any UE. When these conditions are met, a UE that monitors PEI will have paging subgrouping enabled, will know its paging subgroup, and will be able to monitor the appropriate bit(s) in PEI (i.e., the third case mentioned above will never occur).

Another solution for the third case mentioned above is to define the behavior of a UE that monitors PEI but does not support paging subgrouping, does not have paging subgrouping enabled, and/or does not belong to a paging subgroup.

In some cases, a UE that does not support or enable paging subgrouping, or which does not belong to a paging subgroup, may be configured to monitor a particular bit of a multiple bit PEI field, which multiple bit PEI field is configured for paging subgrouping and is separate from the bits for UEs configured with subgrouping. The monitored bit may be reserved for providing PEIs to UEs that are assigned to the PO associated with the bit, but not configured for paging subgrouping. When the monitored bit has a first value, the UE may transition from an awake state to a sleep state (i.e., because the UE is not being paged), and when the monitored bit has a second value, the UE may remain in an awake state to monitor the PO that is associated with the bit. The position of the monitored bit may be a default position, or a position configured by a network. In some embodiments, the monitored bit may be a first bit or a last bit associated with a PO. All UEs that are assigned to the PO but not configured for paging subgrouping may monitor the same bit and, thus, a sort of virtual paging subgroup may be formed for UEs that are not otherwise assigned to a paging subgroup.

In some cases, a UE that does not support or enable paging subgrouping, or which does not belong to a paging subgroup, may be configured to monitor a particular bit of a multiple bit PEI field, which multiple bit PEI field is configured for paging subgrouping. The monitored bit may be used to provide PEIs to UEs in a paging subgroup that does not include the UE. When the monitored bit has a first value, the UE may transition from an awake state to a sleep state (i.e., because the UE is not being paged), and when the monitored bit has a second value, the UE may remain in an awake state to monitor the PO that is associated with the bit. The position of the monitored bit may be a default position, or a position configured by a network. In some embodiments, the monitored bit may be a first bit or a last bit associated with a PO. All UEs that are assigned to the PO but not configured for paging subgrouping may monitor the same bit and, thus, a sort of virtual paging subgroup may be formed for UEs that are not otherwise assigned to a paging subgroup. However, a page for a UE that is assigned to the paging subgroup associated with the bit will generate a false page for a UE that is not assigned to a paging subgroup, and a page for a UE that is not assigned to a paging subgroup will generate a false page for a UE that is assigned to the paging subgroup associated with the bit. Greater power saving may therefore be achieved with the previously described method for paging UEs that are not assigned to a paging subgroup.

In some cases, a UE that does not support or enable paging subgrouping, or which does not belong to a paging subgroup, may be configured to monitor multiple bits (e.g. all of the bits associated with a particular PO) of a multiple bit PEI field, which multiple bit PEI field is configured for paging subgrouping. When all of the monitored multiple bits have a first value, the UE may transition from an awake state to a sleep state (i.e., because the UE is not being paged), and when any one of the monitored multiple bits has a second value, the UE may remain in an awake state to monitor the PO that is associated with the bits. However, a page for any UE that is assigned to a paging subgroup associated with the PO will generate a false page for a UE that is not assigned to a paging subgroup, and a page for a UE that is not assigned to a paging subgroup will generate a false page for the UEs assigned to at least one paging subgroup. Greater power saving may therefore be achieved with the first method described above for paging UEs that are not assigned to a paging subgroup.

Figure 6A:
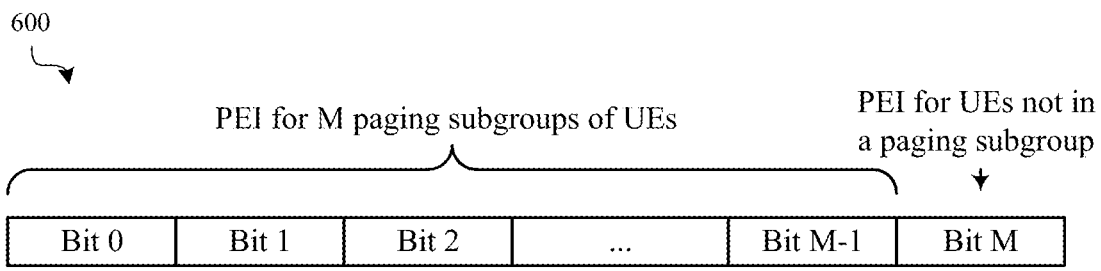
FIGS. 6A-6C provide various examples of multiple bit PEI fields that may be used to provide a PEI to a UE that does not support or enable paging subgrouping, or which does not belong to a paging subgroup.
Figure 6B:
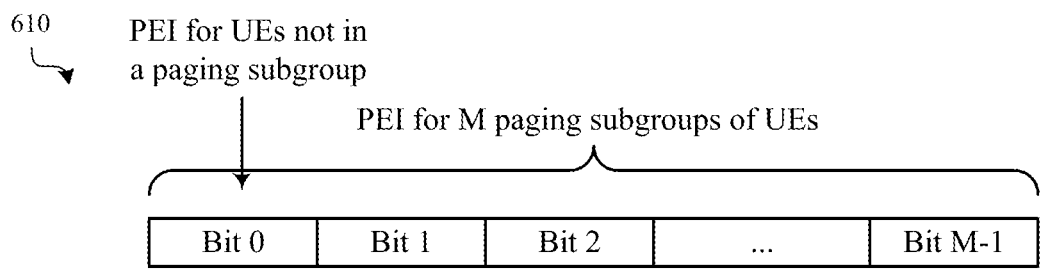
Figure 6B:
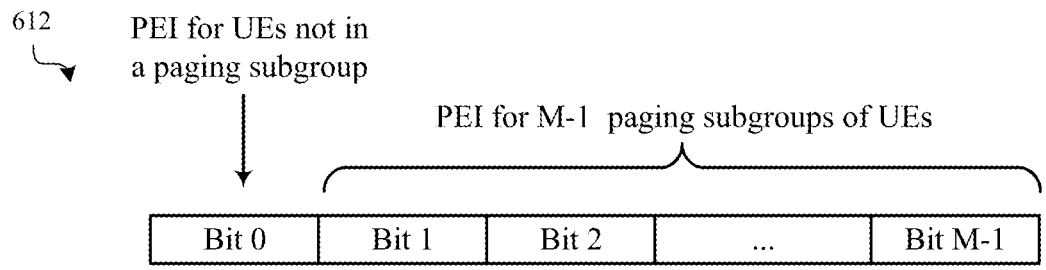
Figure 6C:
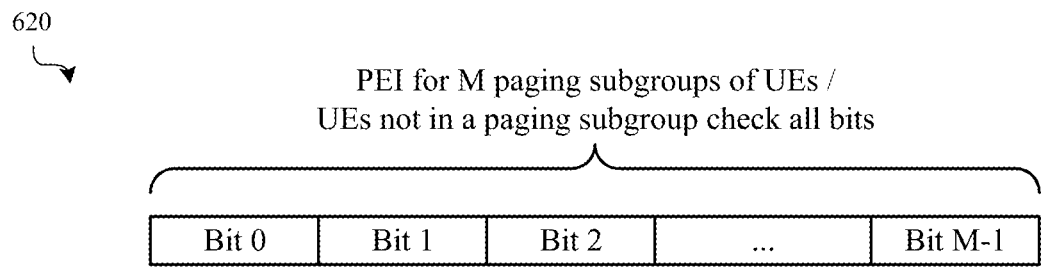

FIGS. 6A-6C provide various examples of multiple bit PEI fields that may be used to provide a PEI to a UE that does not support or enable paging subgrouping, or which does not belong to a paging subgroup. In this manner, the network may assign the UE to a sort of virtual paging subgroup having its own PEI or a PEI shared with a specifically-assigned paging subgroup.

FIG. 6A shows an example multiple bit PEI field 600 in which each of M bits (bits 0 through M−1) is allocated to provide a PEI for a respective paging subgroup, and an additional bit (bit M) is allocated to provide a PEI for UEs that do not support or enable paging subgrouping, or do not belong to a paging subgroup. By way of example, the additional bit is added to the end of the multiple bit PEI field 600, as a last bit of the multiple bit PEI field 600. Alternatively, the additional bit may be added to the beginning of the multiple bit PEI field 600, as a first bit of the multiple bit PEI field 600, or positioned at other bit positions within the multiple bit PEI field 600.

FIG. 6B shows an example multiple bit PEI field 610 in which each of M bits (bits 0 through M−1) is allocated to provide a PEI for a respective paging subgroup. In some embodiments, when a cell or network serves UEs that do not support or enable paging subgrouping, or do not belong to a paging subgroup, one of the bits in the multiple bit PEI field 610 may be used to provide a PEI for the UEs that do not support or enable paging subgrouping or do not belong to a paging subgroup. For example, the first bit (bit 0) may be used to provide a PEI for the UEs that do not support or enable paging subgrouping or do not belong to a paging subgroup. Alternatively, the last bit (bit M−1) or another predetermined or configured bit may be used to provide a PEI for the UEs that do not support or enable paging subgrouping or do not belong to a paging subgroup. Providing a PEI to a UE that does not belong to a paging subgroup in this manner does not require any sort of signaling change, but may generate false pages for UEs in the paging subgroup that shares a bit with the non-grouped UEs (and vice versa).

For CN assigned paging subgrouping, the network can mitigate (or avoid) false pages of UEs that are in (or not in) a paging subgroup by not assigning UEs to a paging subgroup that would require them to monitor a bit, of the multiple bit PEI field 610, that is used to provide a PEI for UEs that do not support or enable paging subgrouping or do not belong to a paging subgroup.

For UE_ID based paging subgrouping, if a subgroup ID as a function of UE_ID can be within the range of 0 to M−1, then it is not possible to prevent UEs in paging subgroups and UEs not in a paging subgroup from sharing a bit of the multiple bit PEI field 610. However, if a subgroup ID is limited to a range 0 to M−2 (or alternatively, to a range of 1 to M−1), then UEs in paging subgroups and UEs not in a paging subgroup can be prevented from sharing a bit of the multiple bit PEI field 610. The limited range of bits for providing PEIs to paging subgroups can be achieved by using a first parameter to determine the number of paging subgroups for a UE to derive a subgroup ID, and using a second parameter to determine the number of bits in the multiple bit PEI field (e.g., the number of bits in PEI PDCCH). For example, there can be eight (8) bits in PEI PDCCH, but the network may indicate, to UEs, that there are seven (7) paging subgroups from which UEs configured with UE_ID based subgrouping can derive a subgroup ID. This allows a bit in a multiple bit PEI field to be used for UEs that are not configured with paging subgrouping.

When there is a mix of UEs with CN assigned paging subgrouping and UE_ID based paging subgrouping, the mechanisms described above can be used together to preserve a bit in a multiple bit PEI field for providing a PEI to UEs that do not support or enable paging subgrouping or do not belong to a paging subgroup.

Alternatively, when a cell or network serves UEs that do not support or enable paging subgrouping, or do not belong to a paging subgroup, the configuration of the multiple bit PEI field 610 may be modified as shown in multiple bit PEI field 612, so that fewer bits (e.g., M−1 bits or, e.g., bits 1 through M−1) are allocated to provide PEIs for respective paging subgroups, and one bit (e.g., bit 0) may be reserved to provide a PEI for the UEs that do not support or enable paging subgrouping or do not belong to a paging subgroup. These latter embodiments are similar to the embodiment described with reference to FIG. 6A.

FIG. 6C shows an example multiple bit PEI field 620 in which each of M bits (bits 0 through M−1) is allocated to provide a PEI for a respective paging subgroup. When a cell or network serves UEs that do not support or enable paging subgrouping, or do not belong to a paging subgroup, a network element (e.g., a network server or base station) may set any one of the bits in the multiple bit PEI field 620 to provide a PEI for the UEs that do not support or enable paging subgrouping or do not belong to a paging subgroup. In effect, a UE that is not configured with a paging subgroup may OR the multiple bits. If one of the bits is already set for the purpose of providing a PEI for a defined paging subgroup, then the network element does not need to set any additional bit to provide a PEI to the UEs that do not support or enable paging subgrouping or do not belong to a paging subgroup. When providing a PEI to a UE that does not belong to a paging subgroup in this manner, the UE that does not belong to the paging subgroup may receive relatively more false pages than when providing a PEI to such a UE as described with reference to FIG. 6A or 6B. Providing a PEI to a UE that does not belong to a paging subgroup in this manner does not require any sort of signaling change, but may in some cases generate false pages for UEs (whether grouped or non-grouped).

As previously described, a multiple bit PEI field may be mapped to multiple PFs. If all of the UEs serviced by a network (or cell) uses the same DRX cycle, the mapping of bits in a multiple bit PEI field to POs in different PFs is uniform across all UEs. However, if the UEs serviced by a network (or cell) use different DRX cycles, the mapping of bits in a multiple bit PEI field to POs in different PFs will be different for UEs having different DRX cycles. This is because each UE determines the mapping in accord with its own DRX cycle.

Figure 7:
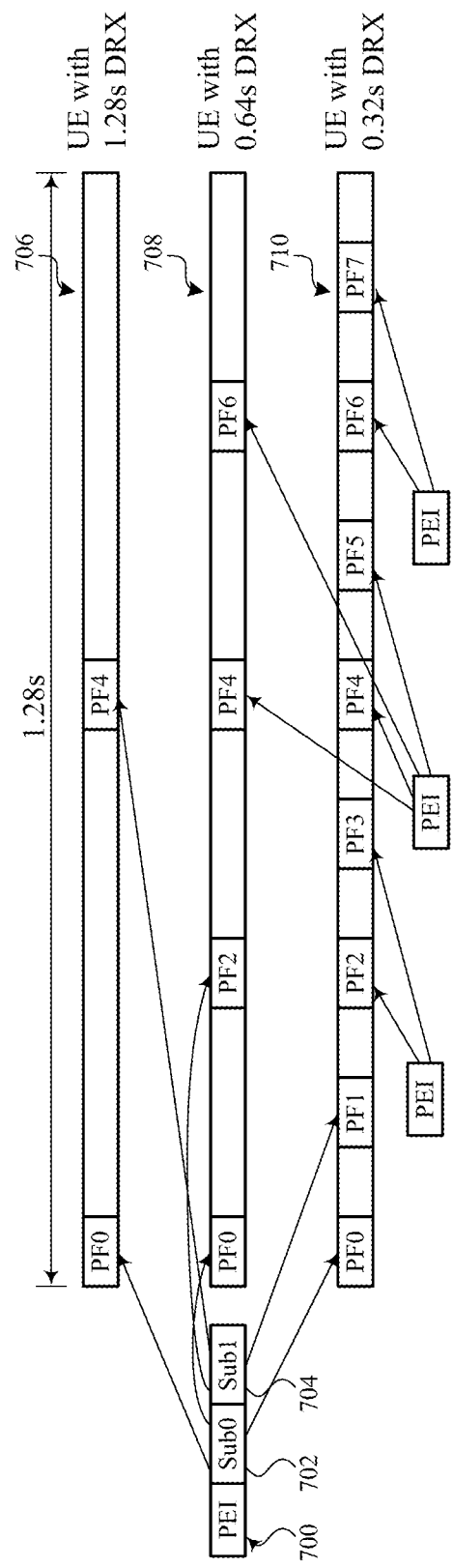
FIG. 7 shows how three different UEs, having three different DRX cycles, may map the bits of a multiple bit PEI field to different PFs.

FIG. 7 shows how three different UEs, having three different DRX cycles 706, 708, 710, may map the bits of a multiple bit PEI field 700 to different PFs. By way of example, the first UE has a 1.28 second(s) DRX cycle 706, the second UE has a 0.64 s DRX cycle 708, and the third UE has a 0.32 s DRX cycle 710. By way of further example, a finest resolution DRX cycle for a network (or cell) may have a 0.32 s DRX cycle (similarly to the third UE). Also by way of example, the multiple bit PEI field 700 may be mapped to POs in two different PFs. In particular, a first subset of bits 702 in the multiple bit PEI field 700 may be mapped to POs in a first PF by a UE, and a second subset of bits 704 in the multiple bit PEI field 700 may be mapped to POs in a second PF by a UE. For sake of simplicity, the POs within a PF, and the bits of the multiple bit PEI field 700 that are mapped to particular POs, are not shown in FIG. 7.

Each of the first, second, and third UEs, having the respective first, second, and third DRX cycles 706, 708, 710, may map the first subset of bits 702 in the multiple bit PEI field 700 to a first PF (PF0) in the most granular DRX cycle. However, each of the first, second, and third UEs may map the second subset of bits 704 to a different PF. For example, the first UE may map the second subset of bits 704 to a fifth PF (PF4) in the most granular DRX cycle, the second UE may map the second subset of bits 704 to a third PF (PF2) in the most granular DRX cycle, and the third UE may map the second subset of bits 704 to a second PF (PF1) in the most granular DRX cycle. From a network perspective, this means that a multiple bit PEI field 700, intended to be mapped to two PFs, may be mapped to PFs occupying more than two time locations or subframes (e.g., mapped to four PFs in the provided example). This is against the original intention of the 3GPP agreements. In other words, the multiple bit PEI field 700 may be mapped to different PFs for UEs with different DRX cycles. The network should still be able to handle such a case, because the mapping is deterministic for each UE. However, it is more complicated for the network to manage.

In addition to the mapping shown in FIG. 7 creating ambiguity and/or increased overhead on the network side, UEs with a longer (or lower resolution) DRX cycle may have a longer time gap between a PEI and one or more later-occurring PFs. This means a greater paging latency for the UEs that have POs in these later PFs. For example, for a UE having the first DRX cycle 706 and a PO in the second PF associated with the multiple bit PEI field 700, the UE may have an additional paging delay of 0.48 s over a UE having the third DRX cycle 710 and a PO in the second PF associated with the multiple bit PEI field 700. In some cases, a UE having a longer DRX cycle and a PO in the second PF associated with the multiple bit PEI field 700 may need to perform additional time/frequency tracking before it can monitor its PO, which may consume more UE power.

Figure 8:
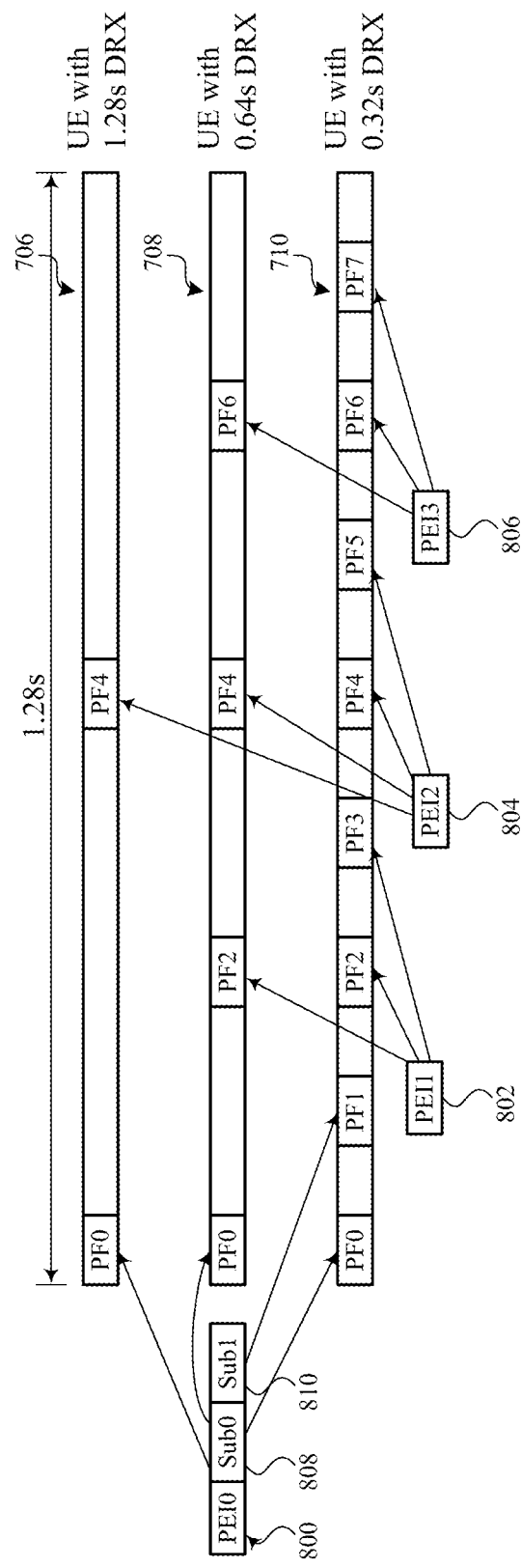
FIG. 8 shows an example of how the three different UEs discussed with reference to FIG. 7 can map a multiple bit PEI field to multiple PFs in the same way, and not depending on their own DRX cycles.

FIG. 8 shows an example of how the three different UEs discussed with reference to FIG. 7 can map a multiple bit PEI field to multiple PFs in the same way, and not depending on their own DRX cycles. More particularly, a network (e.g., a network server or a base station) may signal a reference DRX cycle to UEs. In some embodiments, the reference DRX cycle may be signaled in a system information block (SIB). The reference DRX cycle may define the most granular (or smallest) DRX cycle under which a UE may operate. In FIG. 8, the reference DRX cycle may be the third DRX cycle 710 (i.e., a 0.32 s DRX cycle). A UE may receive an indication of the reference DRX cycle and determine, based at least partly on the reference DRX cycle, a mapping between a multiple bit PEI field and a PO. In particular, the UE may determine a mapping between a multiple bit PEI field including the UE's PEI and a PO in the UE's PF. By comparing its DRX cycle to a reference DRX cycle, a UE may map a multiple bit PEI field to a PO in one of two or more PFs as the network intends, and each UE may map a multiple bit PEI field to POs in two or more PFs in the same way.

As an example, FIG. 8 shows how each multiple bit PEI field in a set of multiple bit PEI fields 800, 802, 804, 806 is mapped to POs in two different PFs. In particular, a first subset of bits 808 in the first multiple bit PEI field (PEI0) 800 may be mapped to a first PF (PF0) in the reference DRX cycle, and a second subset of bits 810 in the first multiple bit PEI field 800 (PEI0) may be mapped to a second PF (PF1) in the reference DRX cycle. Similarly, a first subset of bits in the second multiple bit PEI field 802 (PEI1) may be mapped to a third PF (PF2) in the reference DRX cycle; a second subset of bits in the second multiple bit PEI field 802 (PEI1) may be mapped to a fourth PF (PF3); a first subset of bits in the third multiple bit PEI field 804 (PEI2) may be mapped to a fifth PF (PF4) in the reference DRX cycle; a second subset of bits in the third multiple bit PEI field 804 (PEI2) may be mapped to a sixth PF (PF5); a first subset of bits in the fourth multiple bit PEI field 806 (PEI3) may be mapped to a seventh PF (PF6) in the reference DRX cycle; and a second subset of bits in the fourth multiple bit PEI field 806 (PEI3) may be mapped to an eighth PF (PF7). In this manner, each sequentially transmitted multiple bit PEI field is mapped to two consecutive PFs, and each UE maps a particular multiple bit PEI field to the same set of PFs (although UEs having DRX cycles that are longer than the reference DRX cycle may ignore portions or all of some multiple bit PEI fields). This simplifies PEI management on the network side, and minimizes the time gap between a multiple bit PEI field and the set of PFs to which it is mapped (which can be beneficial for both a reduction in paging delay and power savings for some UEs).

As one example, a UE's relative PO index ($i_{PO}$) within a multiple bit PEI field may be determined using the formula:

$$i_{PO}=((UE\_ID \bmod N) \times N_S \times K + i\_s) \bmod POnumPerPEI$$

where N is the number of PFs represented in the PEI field, $N_S$ is the number of POs for a PF, K is a ratio of the UE's DRX cycle to the reference DRX cycle, and i_s is an index of the UE's PO in a PF.

From a network perspective (e.g., from the perspective of a network element such as a network server or base station), the network element may signal a reference DRX cycle to at least one UE via a communications interface of the network element, and populate a sequence of multiple bit PEI fields. Each multiple bit PEI field in the sequence of multiple bit PEI fields may be mapped to a predetermined subset of PFs within the reference DRX cycle.

It was previously indicated that the reference DRX cycle may define the most granular (or smallest) DRX cycle under which a UE may operate. However, scenarios may arise in which the reference DRX cycle is not the most granular (or smallest) DRX cycle under which a UE may operate. In these scenarios, UEs having DRX cycles that are more granular (or smaller) than the reference DRX cycle (hereafter referred to as small DRX cycle UEs) may be handled in various ways. In some embodiments, small DRX cycle UEs may determine a mapping of PEIs to POs/PFs based on their own DRX cycle. In these embodiments, small DRX cycle UEs create, for a network, the same sort of management and overhead issues described with reference to FIG. 7.

In other embodiments, small DRX cycle UEs may always map a PEI to a single PO (i.e., on a one-to-one basis). In other embodiments, small DRX cycle UEs may not support the mapping of a multiple PFs to a PEI. That is, if POnumPerPEI≤the number of POs per PF, the UE follows the behavior described with reference to FIG. 7; otherwise, the UE maps all of the POs in one PF to a single PEI. The motivation for the behaviors described in this paragraph is that, for UEs configured with very small DRX cycles, paging latency may be critical and it may be preferred not to map multiple POs or multiple PFs to one PEI.

There can also be other behaviors defined for small DRX cycle UEs, and the behavior for these UEs may be configurable between different options.

The described solutions for small DRX cycle UEs are likely most desirable when there is a small number of UEs with small DRX cycles, or when the probability of paging these UEs is low. In this case, the network may prefer to group PFs based on a larger DRX cycle.

Embodiments contemplated herein include an apparatus having means to perform one or more elements of the method 400 or 500. In the context of method 400, this apparatus may be, for example, an apparatus of a UE (such as a wireless device 902, 1002 that is a UE, as described herein). In the context of method 500, this apparatus may be, for example, an apparatus of a base station or CN (such as a network element 912, 926, 1018, or 1024, as described herein).

Embodiments contemplated herein include one or more non-transitory computer-readable media storing instructions to cause an electronic device, upon execution of the instructions by one or more processors of the electronic device, to perform one or more elements of the method 400 or 500. In the context of method 400, this non-transitory computer-readable media may be, for example, a memory of a UE (such as a memory 1006 of a wireless device 1002 that is a UE, as described herein). In the context of method 500, this non-transitory computer-readable media may be, for example, a memory of a base station or CN (such as a memory of a base station 1018 or a memory 1028 of a network device 1024, as described herein).

Embodiments contemplated herein include an apparatus having logic, modules, or circuitry to perform one or more elements of the method 400 or 500. In the context of method 400, this apparatus may be, for example, an apparatus of a UE (such as a wireless device 1002 that is a UE, as described herein). In the context of method 500, this apparatus may be, for example, an apparatus of a base station or a CN (such as a base station 1018 or a network device 1024, as described herein).

Embodiments contemplated herein include an apparatus having one or more processors and one or more computer-readable media, using or storing instructions that, when executed by the one or more processors, cause the one or more processors to perform one or more elements of the method 400 or 500. In the context of method 400, this apparatus may be, for example, an apparatus of a UE (such as a wireless device 1002 that is a UE, as described herein). In the context of the method 500, this apparatus may be, for example, an apparatus of a base station or CN (such as a base station 1018 or a network device 1024, as described herein).

Embodiments contemplated herein include a signal as described in or related to one or more elements of the method 400 or 500.

Embodiments contemplated herein include a computer program or computer program product having instructions, wherein execution of the program by a processor causes the processor to carry out one or more elements of the method 400 or 500. In the context of method 400, the processor may be a processor of a UE (such as a processor(s) 1004 of a wireless device 1002 that is a UE, as described herein), and the instructions may be, for example, located in the processor and/or on a memory of the UE (such as a memory 1006 of a wireless device 1002 that is a UE, as described herein). In the context of method 500, the processor may be a processor of a base station or a CN (such as a processor of a base station 1018 or a processor 1026 of a network device 1024, as described herein), and the instructions may be, for example, located in the processor and/or on a memory of the base station or CN (such as a memory of a base station 1018 or a memory 1028 of a network device 1024, as described herein).

Figure 9:
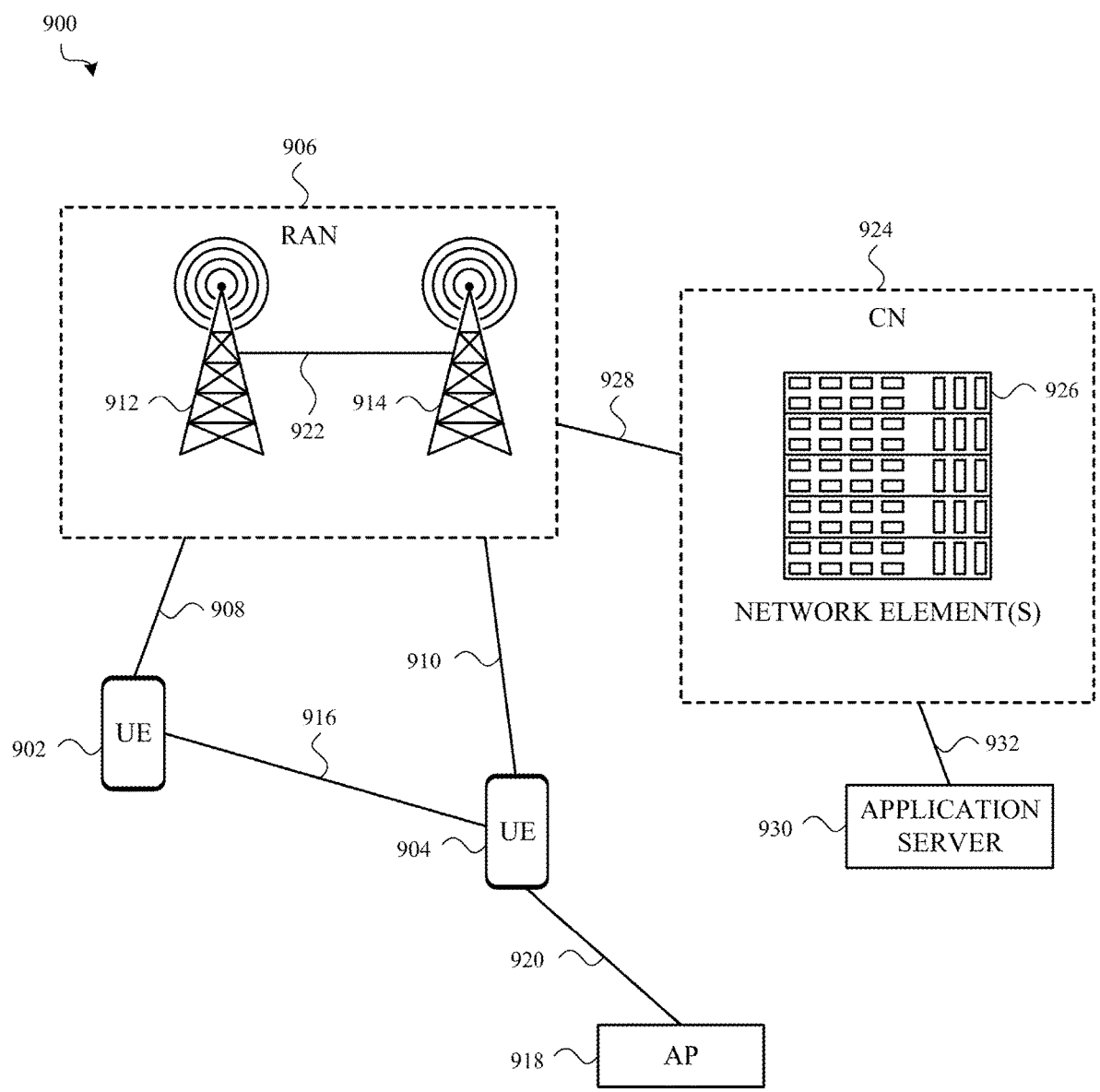
FIG. 9 illustrates an example architecture of a wireless communication system, according to embodiments disclosed herein.

FIG. 9 illustrates an example architecture of a wireless communication system 900, according to embodiments disclosed herein. The following description is provided for an example wireless communication system 900 that operates in conjunction with the 4G or LTE system standards and/or 5G or NR system standards as provided by 3GPP technical specifications.

As shown by FIG. 9, the wireless communication system 900 includes UE 902 and UE 904 (although any number of UEs may be used). In this example, the UE 902 and the UE 904 are illustrated as smartphones (e.g., handheld touchscreen mobile computing devices connectable to one or more cellular networks), but may also comprise any mobile or non-mobile computing device configured for wireless communication.

The UE 902 and UE 904 may be configured to communicatively couple with a RAN 906. In embodiments, the RAN 906 may be NG-RAN, E-UTRAN, etc. The UE 902 and UE 904 utilize connections (or channels) (shown as connection 908 and connection 910, respectively) with the RAN 906, each of which comprises a physical communications interface. The RAN 906 can include one or more base stations, such as base station 912 and base station 914, that enable the connection 908 and connection 910.

In this example, the connection 908 and connection 910 are air interfaces to enable such communicative coupling, and may be consistent with RAT(s) used by the RAN 906, such as, for example, an LTE and/or NR.

In some embodiments, the UE 902 and UE 904 may also directly exchange communication data via a sidelink interface 916. The UE 904 is shown to be configured to access an access point (shown as AP 918) via connection 920. By way of example, the connection 920 can comprise a local wireless connection, such as a connection consistent with any IEEE 802.11 protocol, wherein the AP 918 may comprise a Wi-Fi® router. In this example, the AP 918 may be connected to another network (for example, the Internet) without going through a CN 924.

In embodiments, the UE 902 and UE 904 can be configured to communicate using orthogonal frequency division multiplexing (OFDM) communication signals with each other or with the base station 912 and/or the base station 914 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 912 or base station 914 may be implemented as one or more software entities running on server computers as part of a virtual network. In addition, or in other embodiments, the base station 912 or base station 914 may be configured to communicate with one another via interface 922. In embodiments where the wireless communication system 900 is an LTE system (e.g., when the CN 924 is an EPC), the interface 922 may be an X2 interface. The X2 interface may be defined between two or more base stations (e.g., two or more eNBs and the like) that connect to an EPC, and/or between two eNBs connecting to the EPC. In embodiments where the wireless communication system 900 is an NR system (e.g., when CN 924 is a 5GC), the interface 922 may be an Xn interface. The Xn interface is defined between two or more base stations (e.g., two or more gNBs and the like) that connect to 5GC, between a base station 912 (e.g., a gNB) connecting to 5GC and an eNB, and/or between two eNBs connecting to 5GC (e.g., CN 924).

The RAN 906 is shown to be communicatively coupled to the CN 924. The CN 924 may comprise one or more network elements 926, including one or more AMFs, which are configured to offer various data and telecommunications services to customers/subscribers (e.g., users of UE 902 and UE 904) who are connected to the CN 924 via the RAN 906. The components of the CN 924 may be implemented in one physical device or separate physical devices including components to read and execute instructions from a machine-readable or computer-readable medium (e.g., a non-transitory machine-readable storage medium).

In embodiments, the CN 924 may be an EPC, and the RAN 906 may be connected with the CN 924 via an S1 interface 928. In embodiments, the S1 interface 928 may be split into two parts, an S1 user plane (S1-U) interface, which carries traffic data between the base station 912 or base station 914 and a serving gateway (S-GW), and the S1-MME interface, which is a signaling interface between the base station 912 or base station 914 and mobility management entities (MMEs).

In embodiments, the CN 924 may be a 5GC, and the RAN 906 may be connected with the CN 924 via an NG interface 928. In embodiments, the NG interface 928 may be split into two parts, an NG user plane (NG-U) interface, which carries traffic data between the base station 912 or base station 914 and a user plane function (UPF), and the S1 control plane (NG-C) interface, which is a signaling interface between the base station 912 or base station 914 and AMFs.

Generally, an application server 930 may be an element offering applications that use internet protocol (IP) bearer resources with the CN 924 (e.g., packet switched data services). The application server 930 can also be configured to support one or more communication services (e.g., VoIP sessions, group communication sessions, etc.) for the UE 902 and UE 904 via the CN 924. The application server 930 may communicate with the CN 924 through an IP communications interface 932.

Figure 10:
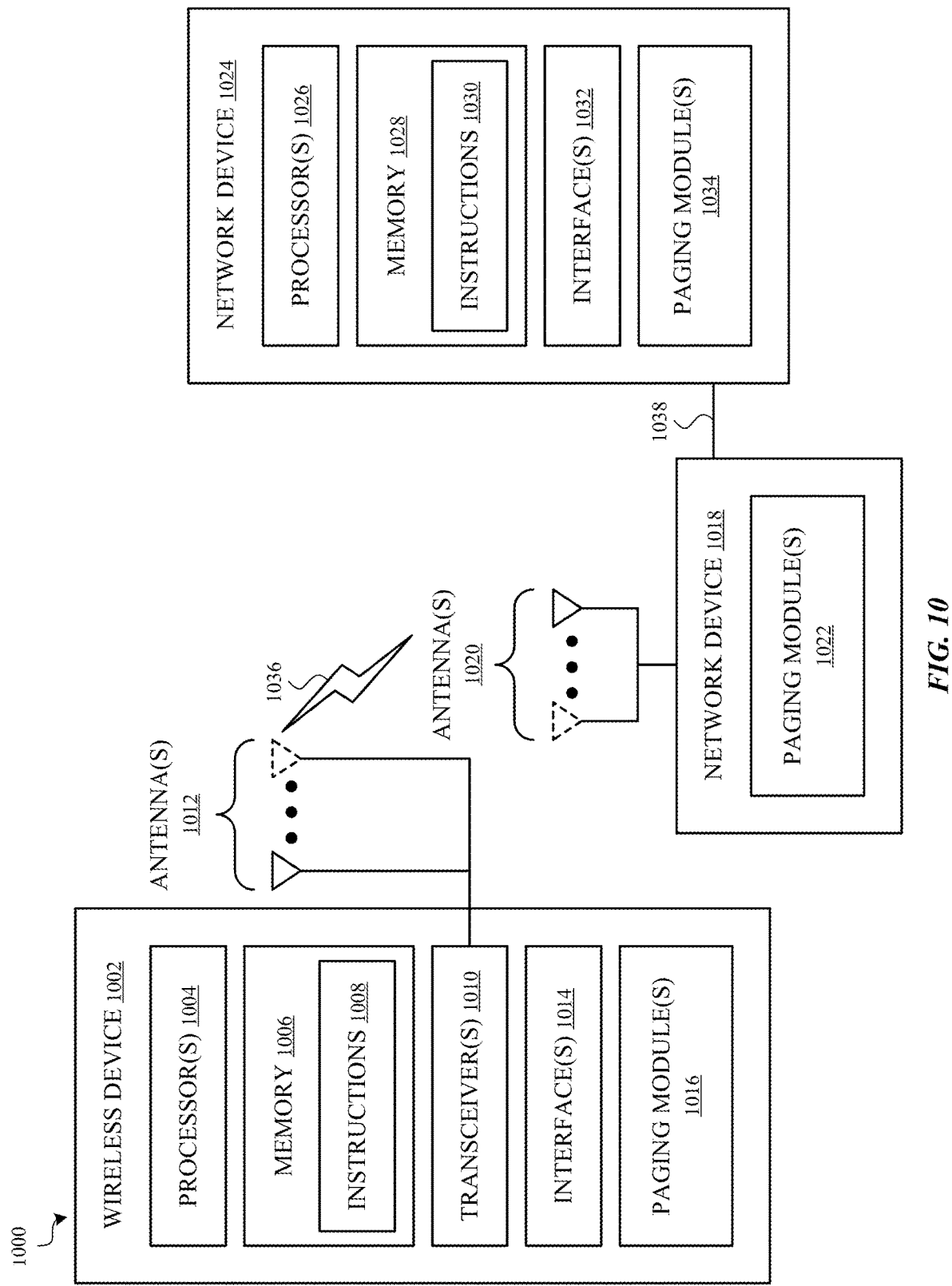
FIG. 10 illustrates a system for performing signaling between a wireless device and a network device, according to embodiments disclosed herein.

FIG. 10 illustrates a system 1000 for performing signaling 1036, 1038 between a wireless device 1002 and network devices 1018, 1024, according to embodiments disclosed herein. The system 1000 may be a portion of a wireless communications system as herein described. The wireless device 1002 may be, for example, a UE of a wireless communication system. The network devices 1018, 1024 may include, respectively and by way of example, a base station (e.g., a gNB) and an AMF of a wireless communication system.

The wireless device 1002 may include one or more processor(s) 1004. The processor(s) 1004 may execute instructions such that various operations of the wireless device 1002 are performed, as described herein. The processor(s) 1004 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1002 may include a memory 1006. The memory 1006 may be a non-transitory computer-readable storage medium that stores instructions 1008 (which may include, for example, the instructions being executed by the processor(s) 1004). The instructions 1008 may also be referred to as program code or a computer program. The memory 1006 may also store data used by, and results computed by, the processor(s) 1004.

The wireless device 1002 may include one or more transceiver(s) 1010 that may include radio frequency (RF) transmitter and/or receiver circuitry that use the antenna(s) 1012 of the wireless device 1002 to facilitate signaling (e.g., the signaling 1036) to and/or from the wireless device 1002 with other devices (e.g., the network device 1018) according to corresponding RATs.

The wireless device 1002 may include one or more antenna(s) 1012 (e.g., one, two, four, or more). For embodiments with multiple antenna(s) 1012, the wireless device 1002 may leverage the spatial diversity of such multiple antenna(s) 1012 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1002 may be accomplished according to precoding (or digital beamforming) that is applied at the wireless device 1002 that multiplexes the data streams across the antenna(s) 1012 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1002 may implement analog beamforming techniques, whereby phases of the signals sent by the antenna(s) 1012 are relatively adjusted such that the (joint) transmission of the antenna(s) 1012 can be directed (this is sometimes referred to as beam steering).

The wireless device 1002 may include one or more interface(s) 1014 (e.g., communications interface(s)). The interface(s) 1014 may be used to provide input to or output from the wireless device 1002. For example, a wireless device 1002 that is a UE may include interface(s) 1014 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1010/antenna(s) 1012 already described) that allow for communication between the UE and other devices and may operate according to known protocols (e.g., Wi-Fi®, Bluetooth®, and the like).

The wireless device 1002 may include a paging module 1016. The paging module 1016 may be implemented via hardware, software, or a combination thereof. For example, the paging module 1016 may be implemented as a processor, circuit, and/or instructions 1008 stored in the memory 1006 and executed by the processor(s) 1004. In some examples, the paging module 1016 may be integrated within the processor(s) 1004 and/or the transceiver(s) 1010. For example, the paging module 1016 may be implemented by a combination of software components (e.g., executed by a DSP or a general processor) and hardware components (e.g., logic gates and circuitry) within the processor(s) 1004 or the transceiver(s) 1010.

The paging module 1016 may be used for various aspects of the present disclosure, for example, aspects of FIGS. 1-8. The paging module 1016 may be configured to, for example, transmit UE assistance information, monitor a PEI and/or PO, identify a paging subgroup, and so on.

The network device 1018 may also include one or more processor(s). The processor(s) may execute instructions such that various operations of the network device 1018 are performed, as described herein. The processor(s) may include one or more baseband processors implemented using, for example, a CPU, a DSP, an ASIC, a controller, an FPGA device, another hardware device, a firmware device, or any combination thereof configured to perform the operations described herein.

The network device 1018 may include a memory. The memory may be a non-transitory computer-readable storage medium that stores instructions (which may include, for example, the instructions being executed by the processor(s)). The instructions may also be referred to as program code or a computer program. The memory may also store data used by, and results computed by, the processor(s).

The network device 1018 may include one or more transceiver(s) that may include RF transmitter and/or receiver circuitry that use the antenna(s) 1020 of the network device 1018 to facilitate signaling (e.g., the signaling 1036) to and/or from the network device 1018 with other devices (e.g., the wireless device 1002) according to corresponding RATs.

The network device 1018 may include one or more antenna(s) 1020 (e.g., one, two, four, or more). In embodiments having multiple antenna(s) 1020, the network device 1018 may perform MIMO, digital beamforming, analog beamforming, beam steering, etc., as has been described.

The network device 1018 may include one or more interface(s) (e.g., communications interface(s)). The interface(s) may be used to provide input to or output from the network device 1018. For example, a network device 1018 that is a base station may include interface(s) made up of transmitters, receivers, and other circuitry (e.g., other than the transceiver(s)/antenna(s) 1020 already described) that enables the base station to communicate with other equipment (e.g., the network device 1024) in a core network, and/or that enables the base station to communicate with external networks, computers, databases, and the like for purposes of operations, administration, and maintenance of the base station or other equipment operably connected thereto.

The network device 1018 may include a paging module 1022. The paging module 1022 may be implemented via hardware, software, or a combination thereof. For example, the paging module 1022 may be implemented as a processor, circuit, and/or instructions stored in the memory and executed by the processor(s). In some examples, the paging module 1022 may be integrated within the processor(s) and/or the transceiver(s). For example, the paging module 1022 may be implemented by a combination of software components (e.g., executed by a DSP or a general processor) and hardware components (e.g., logic gates and circuitry) within the processor(s) or the transceiver(s).

The paging module 1022 may be used for various aspects of the present disclosure, for example, aspects of FIGS. 1-8. The paging module 1022 may be configured to, for example, facilitate the paging of wireless devices such as the wireless device 1002. The paging module 1022 may also be configured to transmit paging subgroup assignment information received from the network device 1024 to the wireless device 1002; to receive and locally store paging subgroup assignment information received from the network device 1024; and to page the wireless device 1002 in accord with the paging subgroup assignment information.

The network device 1024 may also include one or more processor(s) 1026. The processor(s) 1026 may execute instructions 1030 such that various operations of the network device 1024 are performed, as described herein. The processor(s) 1026 may include one or more processors implemented using, for example, a CPU, a DSP, an ASIC, a controller, an FPGA device, another hardware device, a firmware device, or any combination thereof configured to perform the operations described herein.

The network device 1024 may include a memory 1028. The memory 1028 may be a non-transitory computer-readable storage medium that stores instructions 1030 (which may include, for example, the instructions being executed by the processor(s) 1026). The instructions 1030 may also be referred to as program code or a computer program. The memory 1028 may also store data used by, and results computed by, the processor(s) 1026.

The network device 1024 may include one or more interface(s) 1032 (e.g., communications interface(s)). The interface(s) 1032 may be used to provide input to or output from the network device 1018. For example, a network device 1024 that is an AMF of a core network may include interface(s) made up of transmitters, receivers, and other circuitry that enables the AMF to communicate with other equipment (e.g., the network device 1018 via signaling 1038, or the wireless device 1002 via signaling 1038 and the network device 1018), and/or that enables the AMF to communicate with external networks, computers, databases, and the like for purposes of operations, administration, and maintenance of the AMF or other equipment operably connected thereto.

The network device 1024 may include a paging module 1034. The paging module 1034 may be implemented via hardware, software, or a combination thereof. For example, the paging module 1034 may be implemented as a processor, circuit, and/or instructions 1030 stored in the memory 1028 and executed by the processor(s) 1026. In some examples, the paging module 1034 may be integrated within the processor(s) 1026. For example, the paging module 1034 may be implemented by a combination of software components (e.g., executed by a DSP or a general processor) and hardware components (e.g., logic gates and circuitry) within the processor(s) 1026.

The paging module 1034 may be used for various aspects of the present disclosure, for example, aspects of FIGS. 1-8. The paging module 1034 may be configured to, for example, facilitate the paging of wireless devices such as the wireless device 1002. The paging module 1034 may also be configured to determine paging subgroup assignment information for the wireless device 1002, and to transmit paging subgroup assignment information to the wireless device 1002 and network device 1018.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE), comprising:
a set of one or more transceivers; and
a processor configured to,
  transmit, via the set of one or more transceivers, UE assistance information including a set of preferred time offsets between receipt of a paging early indication (PEI) by the UE and receipt of a paging occasion (PO) by the UE, the set of preferred time offsets including a preferred time offset;
  transition from a sleep state to an awake state prior to the PO;
  monitor for the PEI via the set of one or more transceivers, after transitioning to the awake state;
  when the PEI is received after transitioning to the awake state and the PEI indicates the PO does not include a page for the UE, transition from the awake state to the sleep state; and when the PEI is not received after transitioning to the awake state, or when the PEI indicates the PO includes the page for the UE, remain in the awake state to monitor the PO.

2. The UE of claim 1, wherein the processor is configured to determine the preferred time offset for a signal-to-interference-plus-noise ratio (SINR) or SINR range.

3. The UE of claim 1, wherein:
the processor is configured to estimate an overall power saving gain, for the UE, based on a probability of the UE experiencing different SINR conditions; and
the preferred time offset is determined at least partly in response to the estimated overall power saving gain.

4. The UE of claim 1, wherein each preferred time offset in the set of preferred time offsets associated with a different SINR range in a set of SINR ranges.

5. The UE of claim 4, wherein the set of SINR ranges is predefined.

6. The UE of claim 4, wherein the processor is configured to receive, via the set of one or more transceivers, the set of SINR ranges.

7. The UE of claim 1, wherein the preferred time offset is reported as a number of synchronization signal blocks (SSBs).

8. The UE of claim 1, wherein each preferred time offset in the set of preferred time offsets is reported as a number of slots, a number of symbols, or a number of milliseconds.

9. The UE of claim 1, wherein:
the UE is not configured for paging subgrouping;
the PEI is indicated by a bit in a multiple bit PEI field, the multiple bit PEI field configured for the paging subgrouping; and
the bit is reserved for providing PEIs to UEs that are assigned to the PO but not configured for the paging subgrouping.

10. The UE of claim 1, wherein:
the UE is not configured for paging subgrouping;
the PEI is indicated by a bit in a multiple bit PEI field, the multiple bit PEI field configured for the paging subgrouping; and
the bit is used to provide PEIs to UEs in a paging subgroup that does not include the UE.

11. The UE of claim 1, wherein:
the UE is not configured for paging subgrouping;
the PEI is indicated by a bit in a multiple bit PEI field, the multiple bit PEI field configured for the paging subgrouping; and
the processor is configured to,
monitor multiple bits of the multiple bit PEI field;
when all of the monitored multiple bits have a first value, transition from the awake state to the sleep state; and
when any one of the monitored multiple bits has a second value, remain in the awake state to monitor the PO.

12. A method of a user equipment (UE), comprising:
transmitting, via a set of one or more transceivers, UE assistance information including a set of preferred time offsets between receipt of a paging early indication (PEI) by the UE and receipt of a paging occasion (PO) by the UE, the set of preferred time offsets including a preferred time offset;
transitioning from a sleep state to an awake state prior to the PO;
monitoring for the PEI via the set of one or more transceivers, after transitioning to the awake state;
when the PEI is received after transitioning to the awake state and the PEI indicates the PO does not include a page for the UE, transitioning from the awake state to the sleep state; and
when the PEI is not received after transitioning to the awake state, or when the PEI indicates the PO includes the page for the UE, remaining in the awake state to monitor the PO.

13. The method of claim 12, further comprising:
determining the preferred time offset for a signal-to-interference-plus-noise ratio (SINR) or SINR range.

14. The method of claim 12, further comprising:
estimating an overall power saving gain, for the UE, based on a probability of the UE experiencing different SINR conditions; wherein
the preferred time offset is determined at least partly in response to the estimated overall power saving gain.

15. The method of claim 12, wherein each preferred time offset in the set of preferred time offsets associated with a different SINR range in a set of SINR ranges.

16. The method of claim 12, wherein the preferred time offset is reported as a number of synchronization signal blocks (SSBs).

17. The method of claim 12, wherein each preferred time offset in the set of preferred time offsets is reported as a number of slots, a number of symbols, or a number of milliseconds.

18. The method of claim 12, wherein:
the UE is not configured for paging subgrouping;
the PEI is indicated by a bit in a multiple bit PEI field, the multiple bit PEI field configured for the paging subgrouping; and
the bit is reserved for providing PEIs to UEs that are assigned to the PO but not configured for the paging subgrouping.

19. The method of claim 12, wherein:
the UE is not configured for paging subgrouping;
the PEI is indicated by a bit in a multiple bit PEI field, the multiple bit PEI field configured for the paging subgrouping; and
the bit is used to provide PEIs to UEs in a paging subgroup that does not include the UE.

20. The method of claim 12, wherein:
the UE is not configured for paging subgrouping;
the PEI is indicated by a bit in a multiple bit PEI field, the multiple bit PEI field configured for the paging subgrouping; and the method further includes,
monitoring multiple bits of the multiple bit PEI field;
when all of the monitored multiple bits have a first value, transitioning from the awake state to the sleep state; and
when any one of the monitored multiple bits has a second value, remaining in the awake state to monitor the PO.

* * * * *